United States Patent
McIntyre et al.

(10) Patent No.: US 6,374,773 B1
(45) Date of Patent: Apr. 23, 2002

(54) ANIMAL FEEDING DEVICE

(75) Inventors: Robert Dymock McIntyre, McIntyre's Lane R. D. 5, Hunterville; Robin Whitfield, Palmerston North, both of (NZ)

(73) Assignee: Robert Dymock McIntyre, Hunterville (NZ)

( * ) Notice: Subject to any disclaimer, the term of this patent is extended or adjusted under 35 U.S.C. 154(b) by 0 days.

(21) Appl. No.: 09/423,722

(22) PCT Filed: May 11, 1998

(86) PCT No.: PCT/NZ98/00059

§ 371 Date: Nov. 12, 1999

§ 102(e) Date: Nov. 12, 1999

(87) PCT Pub. No.: WO98/51145

PCT Pub. Date: Nov. 19, 1998

(30) Foreign Application Priority Data

May 12, 1997 (NZ) .................................. 314788

(51) Int. Cl.[7] .................................. A01K 7/00
(52) U.S. Cl. .................................. 119/72
(58) Field of Search .................... 119/72, 72.5, 53, 119/53.5, 54, 75

(56) References Cited

U.S. PATENT DOCUMENTS

| | | | |
|---|---|---|---|
| 1,733,066 A | | 10/1929 | Lyles |
| 2,708,421 A | | 5/1955 | Jauch |
| 2,979,078 A | | 4/1961 | Witz |
| 4,188,914 A | * | 2/1980 | Lage ............... 119/71 |
| 4,214,554 A | | 7/1980 | Smith, Jr. |
| 4,794,880 A | * | 1/1989 | Atchley ........... 119/71 |
| RE34,725 E | * | 9/1994 | Braden ............ 119/71 |

FOREIGN PATENT DOCUMENTS

| | | |
|---|---|---|
| AU | 100351 | 3/1937 |
| GB | 2 012 156 | 7/1979 |
| GB | 2 064 287 | 6/1981 |

* cited by examiner

Primary Examiner—Thomas Price
(74) Attorney, Agent, or Firm—Young & Thompson (57) ABSTRACT

A container (10) for the single feeding of animals includes flexible attachment element (28), and an anchor element (16) on the container (10) cooperates with the flexible attachment element (28) to facilitate mounting of the container (10) to a fixture or structure (R).

14 Claims, 12 Drawing Sheets

ANIMAL FEEDING DEVICE

CROSS REFERENCE TO RELATED APPLICATION

This is the 35 USC 371 national stage of international application PCT/NZ98/00059 filed on May 11, 1998, which designated the United States of America.

BACKGROUND OF THE INVENTION

This invention relates to animal feeding devices, more particularly an animal feeding container intended for single feeding of animals.

It is known to use a bottle with a teat or nipple for the single feeding of young animals. Such feeding bottles can be hand-held, however it is also known to provide a mounting frame or bracket whereby the bottle can be inserted into the frame or bracket. In a normal situation on a farm or the like the frame or bracket is positioned on a structure such as a fence, side of a bale, race or similar.

The provision of a bracket or frame adds to the cost of the animal feeding device. Additional costs also arise from the need to package and transport the additional frame/bracket.

SUMMARY OF THE INVENTION

An object of the present invention is to provide a liquid feed container for the single feeding of an animal which has a mounting arrangement which is simple and effective to use and represents a lower cost means of mounting the container to a fixture than hitherto known arrangements.

An additional disadvantage of known feeding bottles is the lack of stackability of bottles resulting in greater volume for transportation thereby representing an additional cost arising from effectively "freighting air".

It is therefore a further object of the present invention to provide a container for the single feeding of liquid feed to an animal whereby a plurality of such containers can be stacked together.

According to one broad aspect of the invention there is provided a container for the single feeding of animals, the container including a flexible attachment element and anchor means on the container to cooperate with the attachment element to facilitate mounting of the container to a fixture or structure.

According to a second broad aspect of the invention the container as aforesaid is hollow and of a tapering configuration from an open end to an end adapted for the mounting of a feeding nipple.

DESCRIPTION OF THE PREFERRED EMBODIMENTS

The container 10 comprises a hollow body 11 having a large open end 12. The body tapers in the somewhat curved manner shown in the drawings toward a narrow end 13 having an opening 14 into which an end of a teat T can be inserted. As shown in the drawings the hollow body 11 is configured so that it curves from the large open end 12 toward the smaller end 13 such that the longitudinal axis of the teat T is inclined to the plane of the open end 12.

The hollow body 11 incorporates ribbed and/or indented portions 15 which not only add to the aesthetic appeal of the container but also provide a positive finger/hand grip on what could be a slippery container. These indented portions can also provide a degree of strengthening to the wall of the body 11.

Projecting from the wall of the body 11 is a handle/hook 16 having a long foot 17 which extends away from the open end 12. A shorter foot 19 extends in an opposite direction. The leg 18 of the handle 16 is positioned toward the open end 12 of the body 11. The configuration of the body 11 and the positioning of the leg 18 of the handle 16 enables a plurality of containers 10 to be stacked together by inserting one container end 13 first into the open end 12 of another container. The containers will be able to interfit to the point that the leg 18 of the one container engages with the rim 20 of the open end 12 of the other container.

Figure 1:
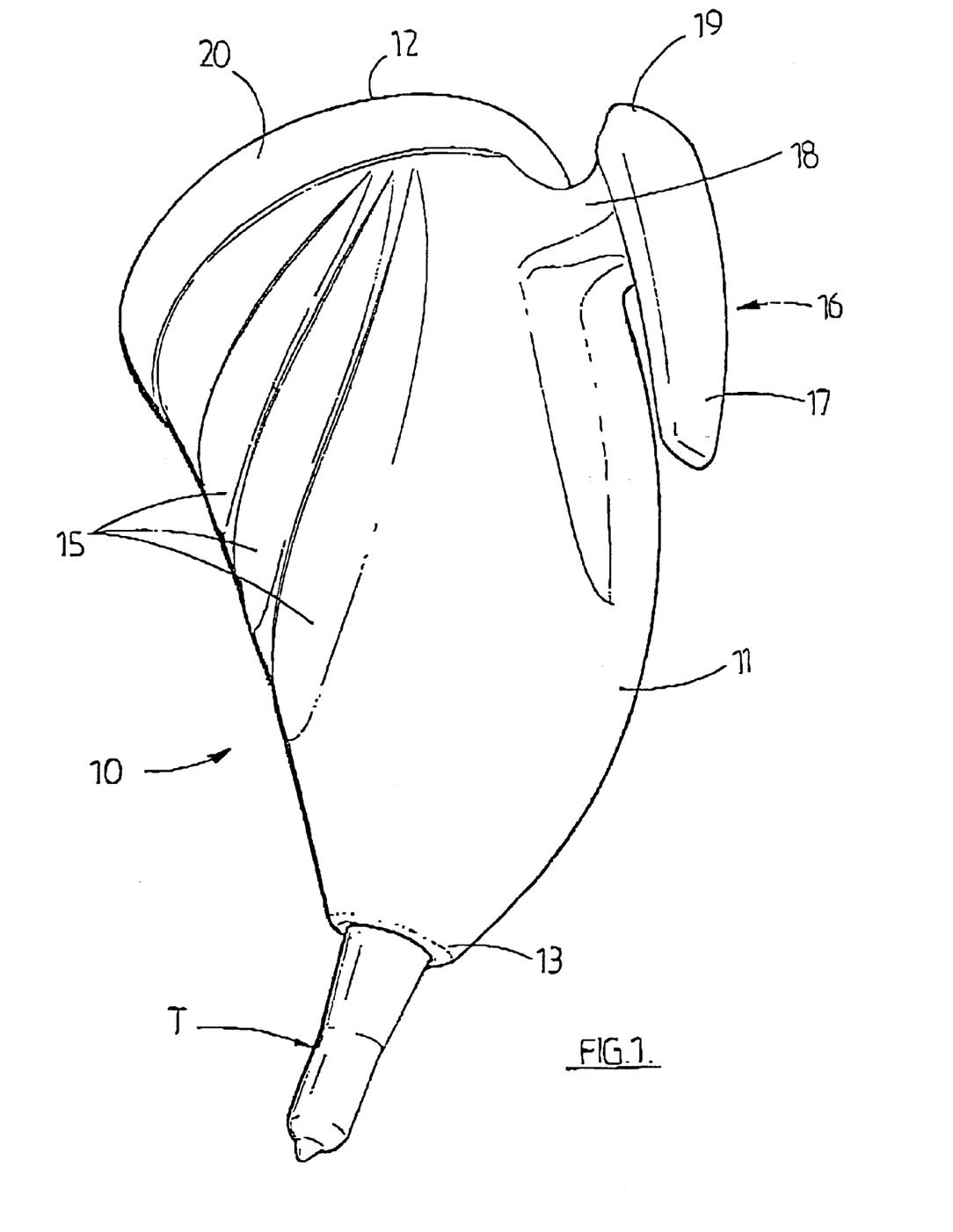
FIG. 1 is a perspective view of the animal feeding container according to one embodiment of the present invention.
Figure 2:
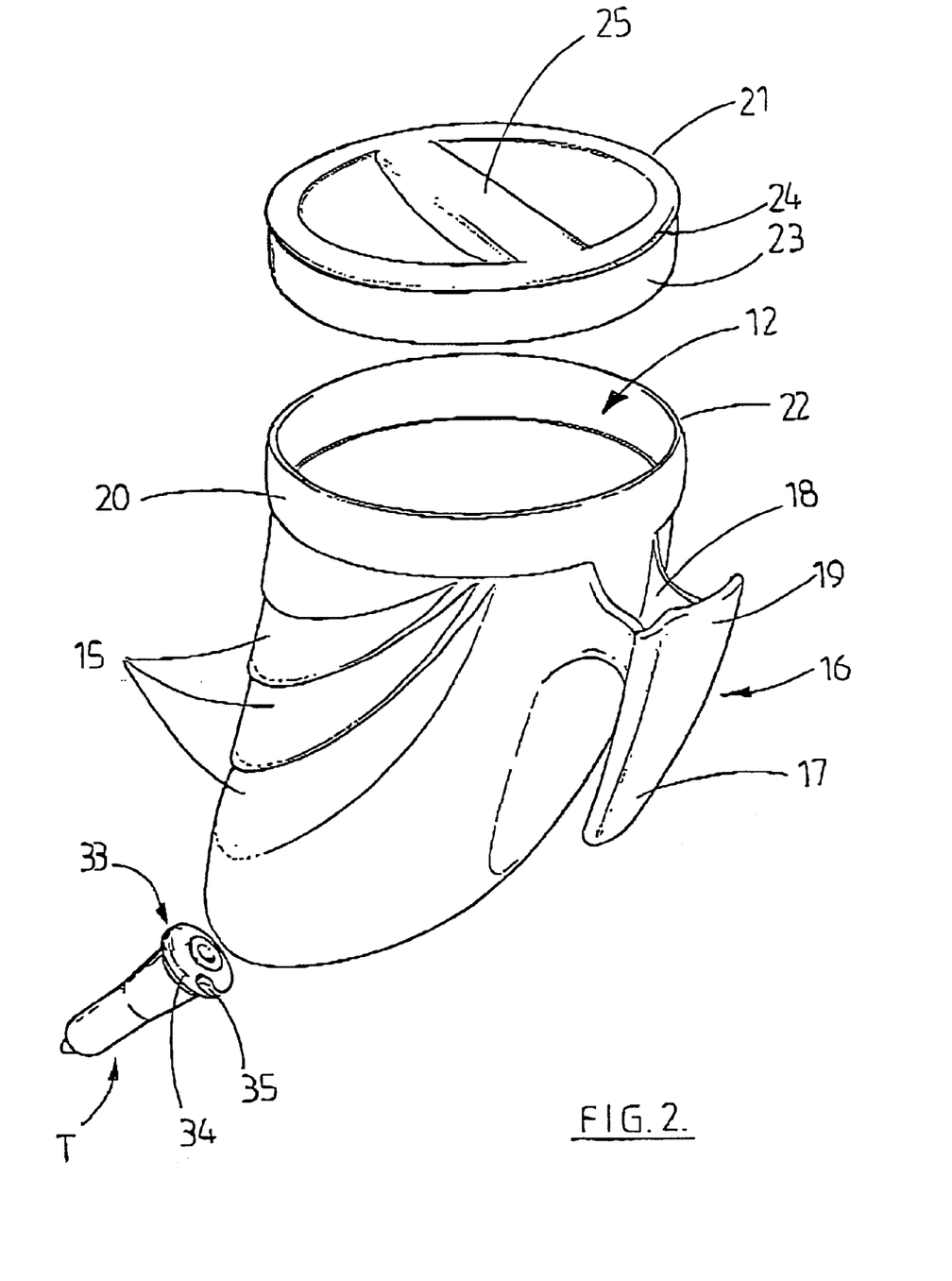
FIG. 2 is an exploded view of the container as shown in FIG. 1.

The rim 20 not only provides strengthening for the open end 12 of the body 11 but also provides a suitably configured area to receive lid 21 (see FIG. 2). In one form, the lid 21 is a friction fit within the rim 20. The friction can be achieved from a resilient sealing ring. Preferably the positioning of the lid when it is placed on the container 10 is determined by a ledge 22 in the container 10 which engages with the end of the skirt 23 of the lid 21. A peripheral rim 24 of the lid 21 can also engage with the peripheral edge of the rim 20. A suitable hand gripping portion 25 can be provided with lid 21 to enable a user to install and remove the lid.

Other constructions of lid and mounting with the container 10 will be apparent to those skilled in the art. It is preferred that the lid 21 be of a type which not only provides a sealing fit but also can be readily installed and removed. In view of the environment in which the container will be used and the type of products to be dispensed it is preferred that the means of installing the lid on the container is such that a difficult to release wedging of the lid on the container will not arise.

In use, the container with teat T installed is filled with liquid food, eg milk or a milk mixture, and the lid installed. The container 10 is then used in a substantially conventional manner to feed an animal. The container 10 can be used in a hand-held manner to feed an individual animal in a conventional way. The user can simply grip the hollow body though the presence of the handle 16 provides one means of ensuring that a firm grip of the container is achievable. The handle 16 provides an advantage over most conventional feeding bottles which are either difficult to grasp or due to a coating of milk fat on the outer surface can be very slippery especially in some climatic conditions, eg rain.

Figure 7:
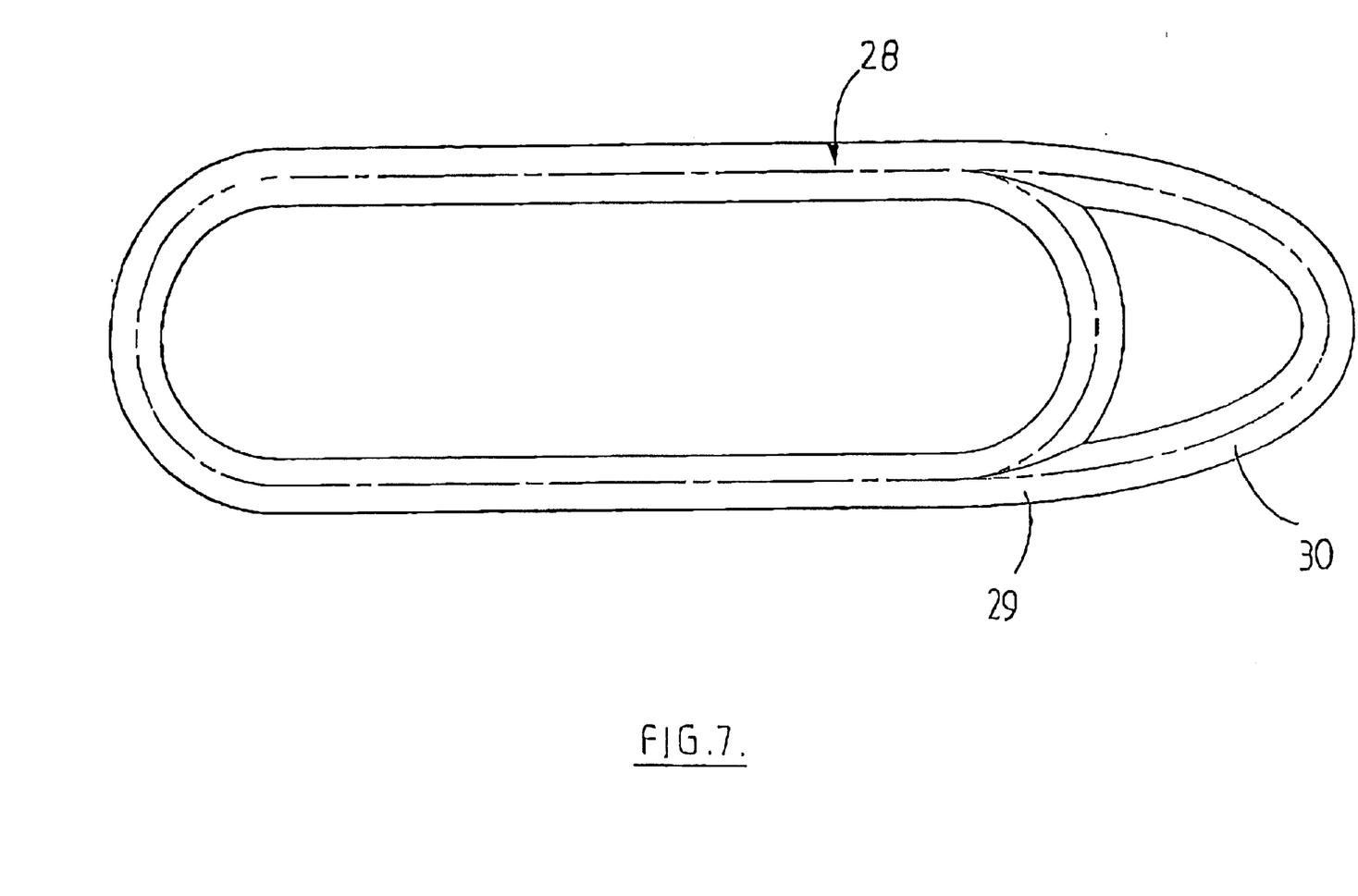
FIG. 7 is a plan view of a flexible and resilient attachment element.

However, the container can also be attached to a suitable fixture such as a fence rail or tubing of a race, stall, gate or the like. This is achieved by the use of an attachment element in the form of an elastic fastener or bungy 28 (see FIG. 7). In its simplest form, bungy 28 can be an elongate ring made of a natural or synthetic rubber of rubber-like plastics material. In the preferred form as shown in FIG. 7 bungy 28 consists of a main elongate ring 29 from the end of which extends a secondary annular portion 30.

The bungy 28 can be used in a number of different ways to enable container 10 to be mounted to a variety of fixtures or structures. For example, in FIG. 4 the container 10 is mounted to a rail R by engaging the long foot 17 of handle 16 over the rail. To ensure that the container is not knocked from the rail the bungy 28 is placed so that it extends around body 11 under the rail R and up over the short leg 19 to engage on what comprises the upper surface of leg 18. The bungy therefore firmly holds the container in position. In such an arrangement the lid 21 does not need to be installed on the container 10.

Figure 3:
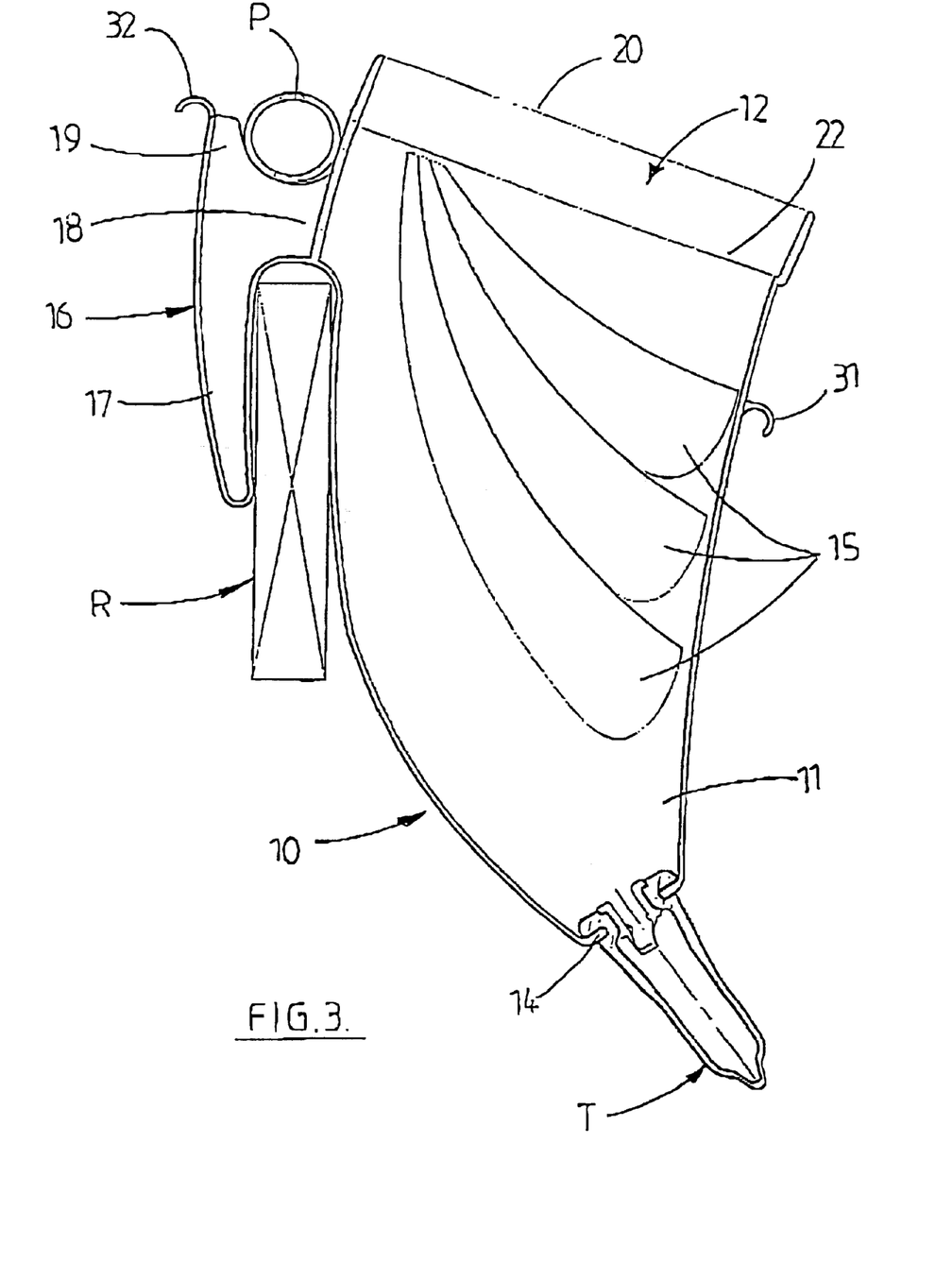
FIG. 3 is a cross-sectional view of the container.
Figure 4:
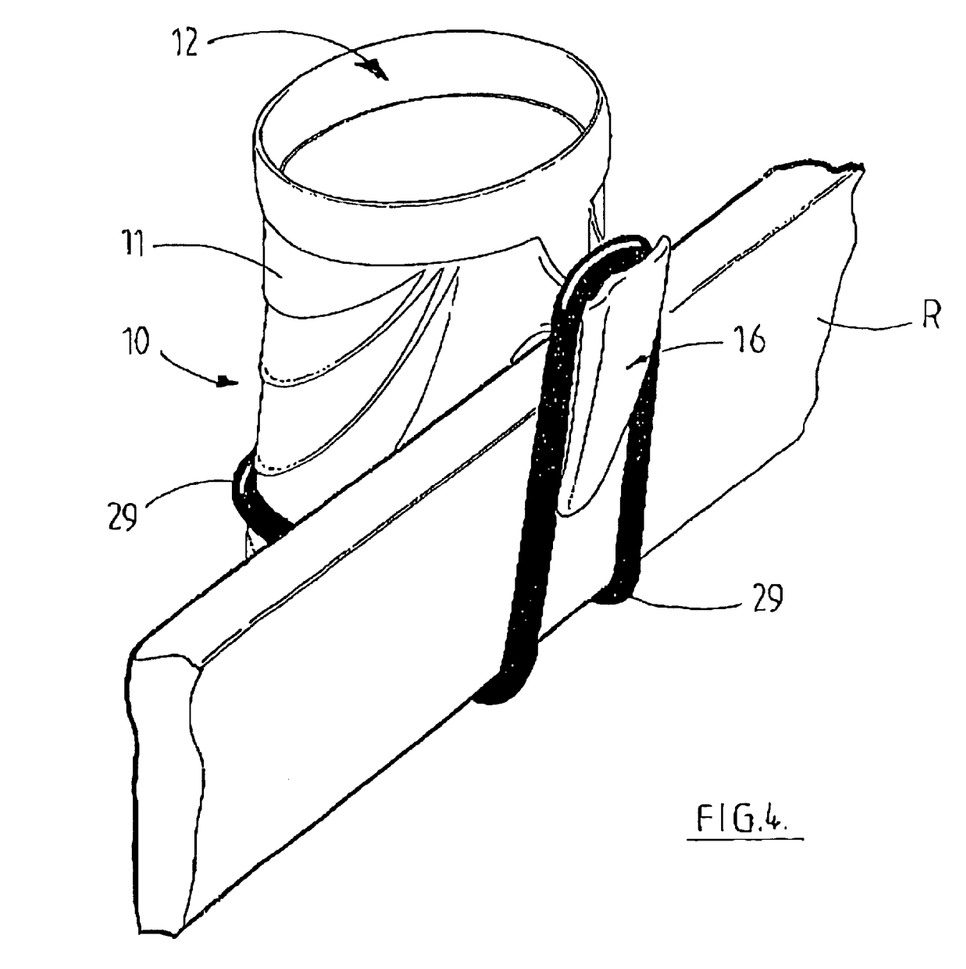
FIG. 4 is a pictorial view of the container mounted by the attachment element according to one arrangement to a fence rail.

Similarly, as shown in FIG. 4, the container 10 can be mounted with the pipe work P and P' of a race, stall or the like. In such an arrangement the bungy 28 extends about the body 11 near rim 20 and over the pipe P to engage with leg 18 behind the long foot 17. As shown in FIG. 3, a small hook 31 is moulded with body 11 opposite the large handle 16 and it is beneath this hook 31 that the bungy 28 is engaged.

Figure 5:
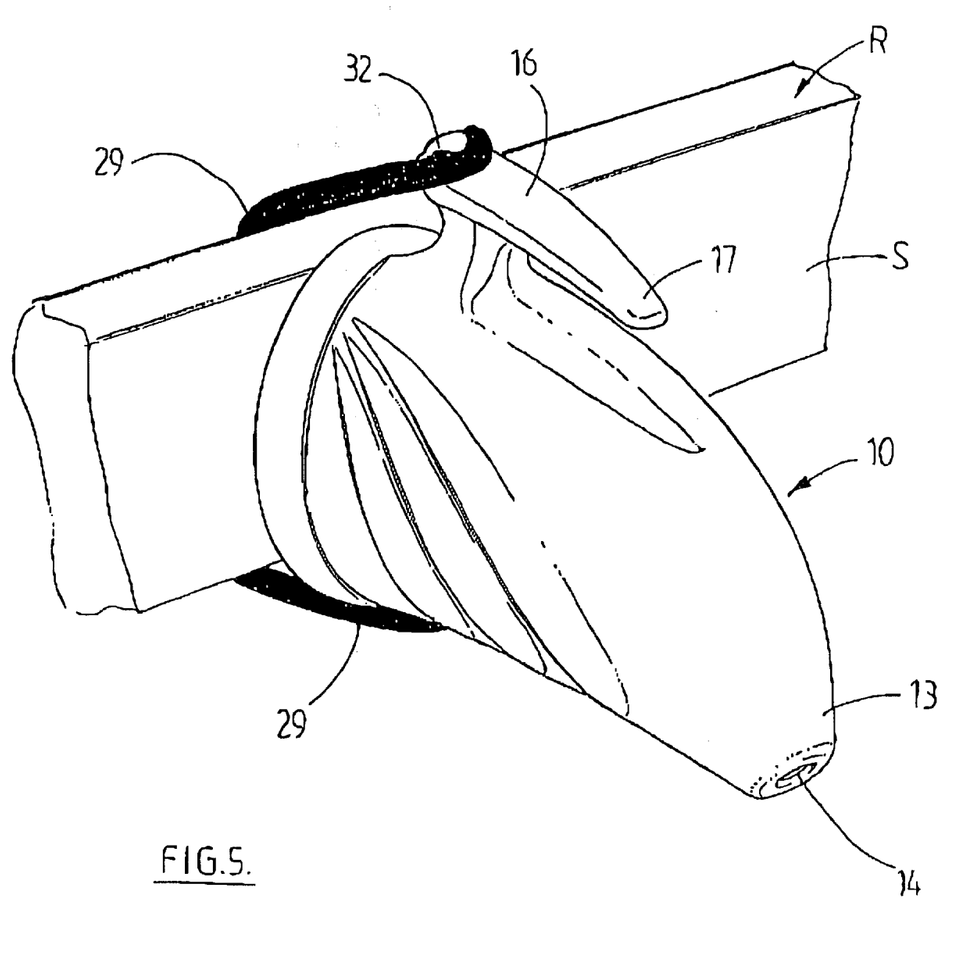
FIG. 5 is a similar pictorial view showing the container mounted according to a further arrangement.
Figure 6:
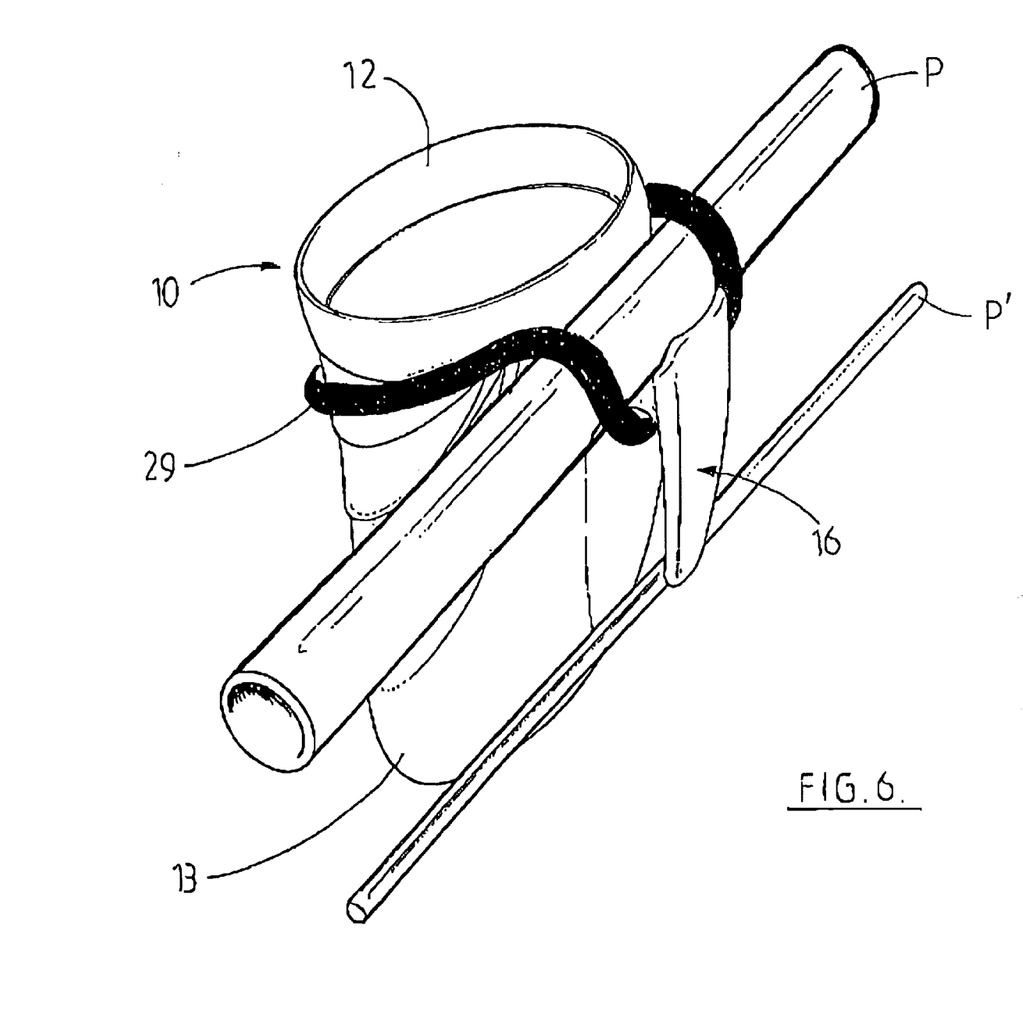
FIG. 6 is yet a further pictorial view of a further manner in which the container can be mounted to a tubular element of a structure.

A further mounting option is shown in FIG. 5 where the lid 21 must be placed on the container 10. In this arrangement the lid is engaged against the vertical flat surface S of the rail R so that the large handle 16 is uppermost. As a consequence of the curve of the body 11 the teat T will incline downwardly at a convenient orientation for a feeding animal. In the arrangement shown in FIG. 5 a modified form of the container 10 is shown where the bungy 28 extends from hook 31 around the rail R to engage with a further small hook 32 moulded with the short leg 19 of the large handle 16. With an arrangement not incorporating hook 32 the bungy is stretched to engage over the distal end of the long foot 17 so as to engage about the leg 18.

The length of bungy required for the different mounting positions can vary as a consequence of the fixtures to which the container is to be mounted as well as the manner of mounting. The different length of bungy is therefore achieved by having the secondary annular extension 30 which can be used when the length of the stretched bungy main portion 29 is insufficient.

The feeding device is therefore versatile in use as it can be hand-held or mounted to a fixture. As no separate mounting bracket or frame is required, the overall cost of the feeding device will, as expected, be lower than known feeding devices presently available. In addition, however, the fact that a separate mounting bracket is not required enables the overall size and hence internal volume of the container to be greater than current feeding bottles. Therefore, a greater volume of feed can be dispensed to the feeding animal. Furthermore, the ability to be able to stack the containers within each other represents a saving to the manufacturer/seller as freight costs can be reduced because a greater number of containers 10 can be packed in a given volume of packaging.

Figure 12:
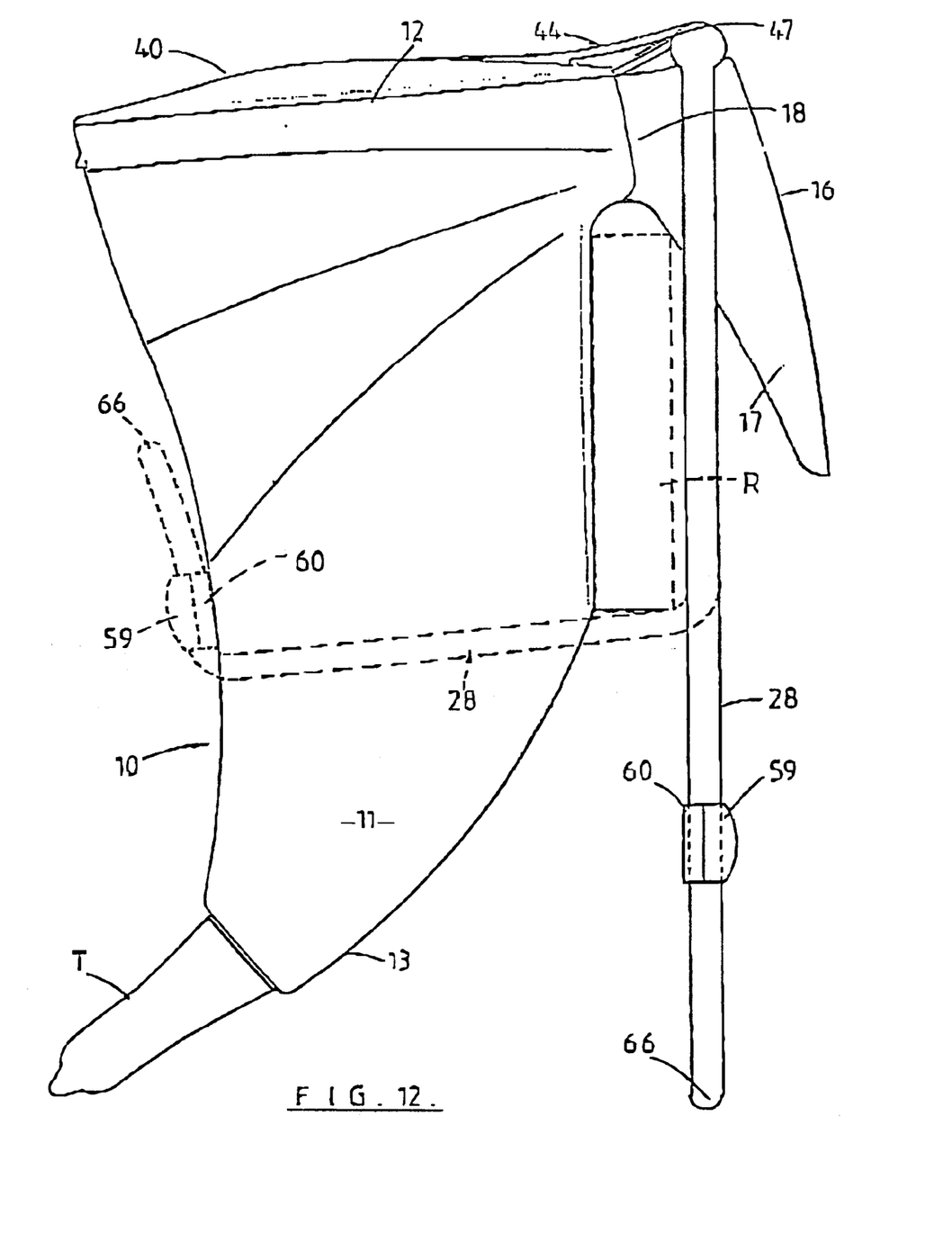
FIG. 12 is an elevation view of a second form of the invention.

The teat T to be used with the container 10 is preferably of the type disclosed in my New Zealand patent specifications 247058 and 293714, which correspond to U.S. Pat. Nos. 5,638,769 and 5,860,541 respectively. Such a teat is shown in FIGS. 12, 13 and 14.

As illustrated and described in U.S. Pat. No. 5,860,541 the teat is formed in one piece and comprises a hollow elongate body having a mounting part at one end and an outlet at the other end. Toward the mounting end the body flares outwardly such that the greatest cross-sectional dimension of this outwardly flaring portion terminates in a shoulder. A peripheral groove is provided adjacent the shoulder. This general construction is, for example, illustrated in FIG. 11 of the present specification.

The mounting part of the teat has a bore which extends from an inlet opening in the mounting part, the bore thus communicating with the interior of the hollow body. A valve is located in the bore. The valve can be of the type shown in FIGS. 6–11 of U.S. Pat. No. 5,860,541 (see FIG. 3 of the present specification).

Figure 13:
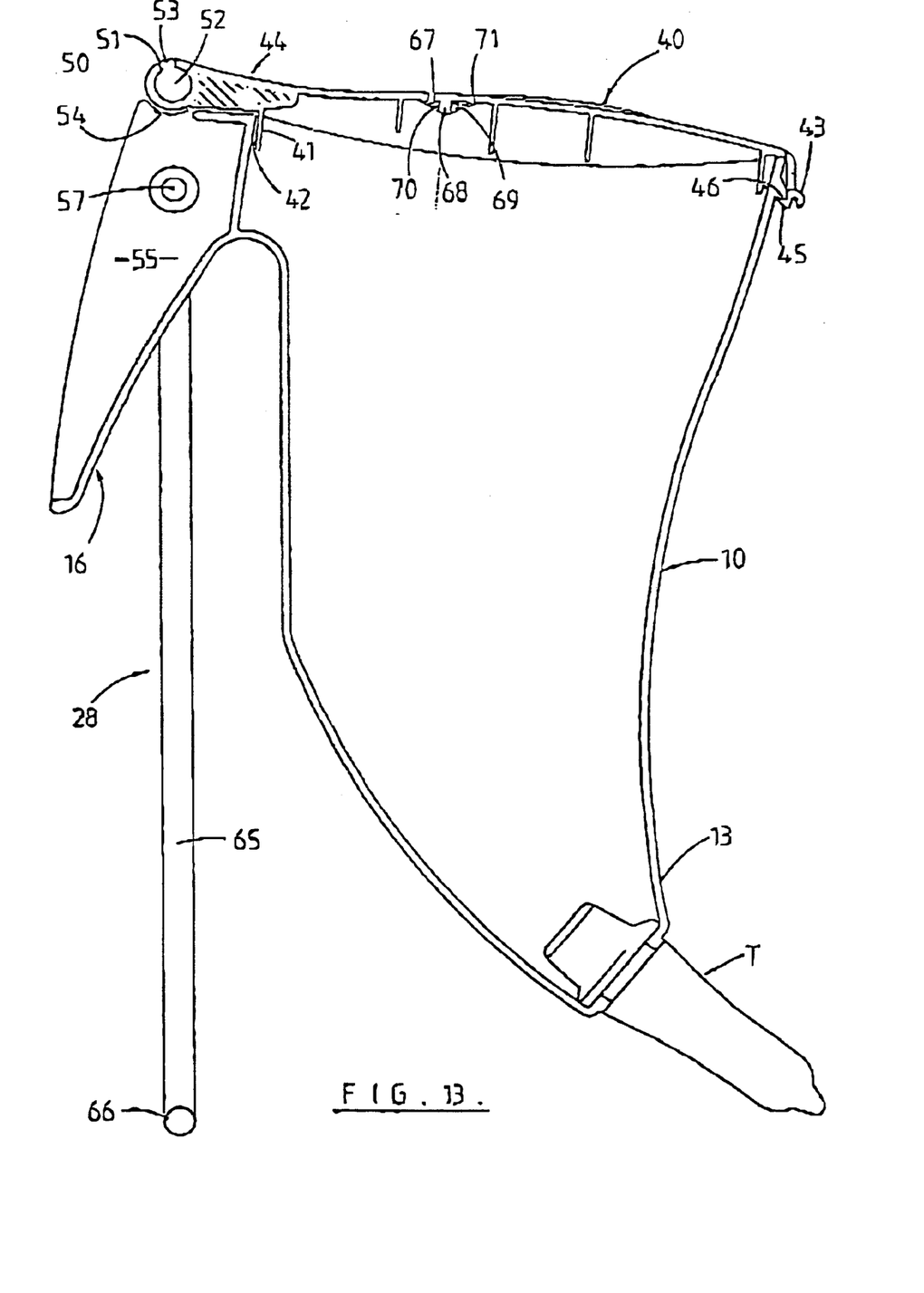
FIG. 13 is a cross-sectional view of the modified version of FIG. 12.
Figure 14:
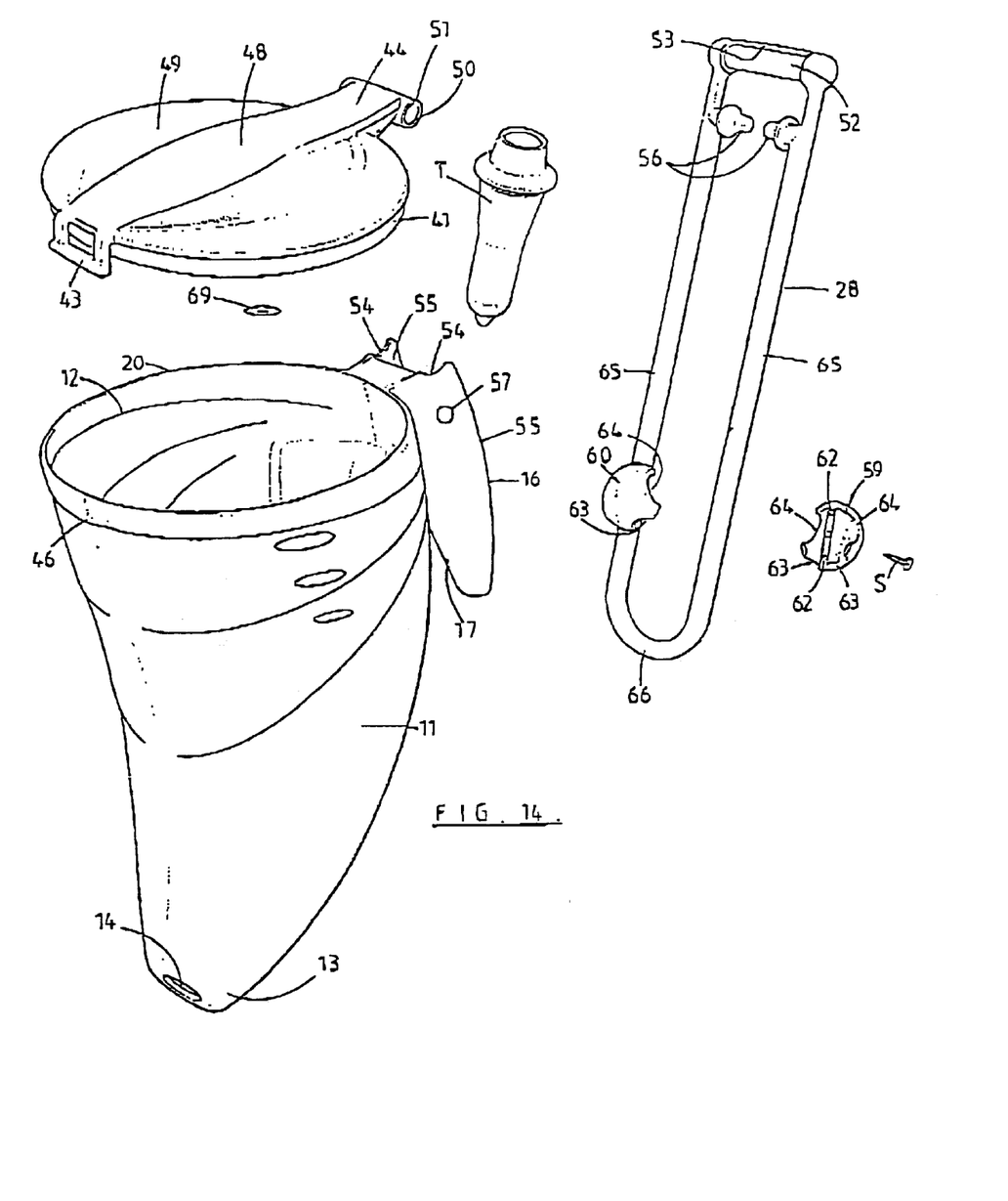
FIG. 14 is a perspective exploded view of the container shown in FIGS. 12 and 13.
Figure 15:
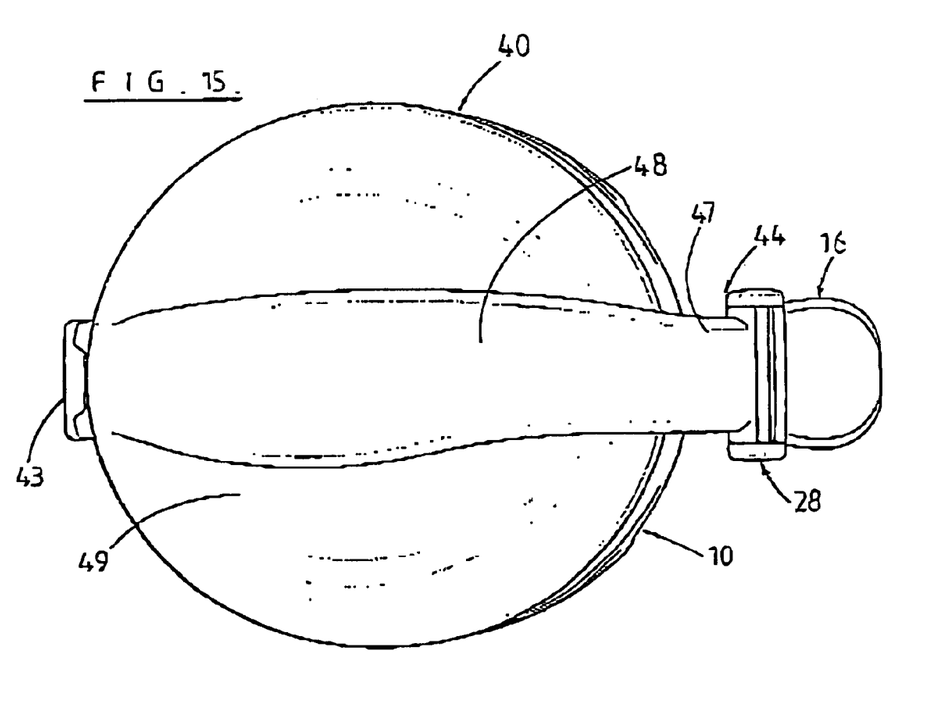
FIG. 15 is a plan view of the container shown in FIGS. 12 and 13.

The teat is in accordance with normal installation techniques located within the container with the feeding end orientated toward the opening 14 whereupon the teat is pushed/pulled through the opening 14 until the grooved portion at the base of the teat locates with the opening 14 (see eg FIG. 13).

It is, however, envisaged that a different configuration of base portion of the teat can be employed to simplify installation/removal of the teat. Such modified forms of teats are shown in FIGS. 8, 9 and 10.

Figure 8:
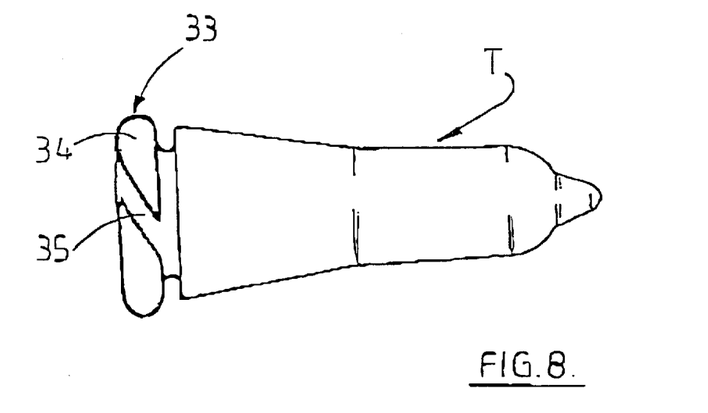
FIG. 8 is an elevation view of a nipple or teat construction suitable for use with the container.
Figure 9:
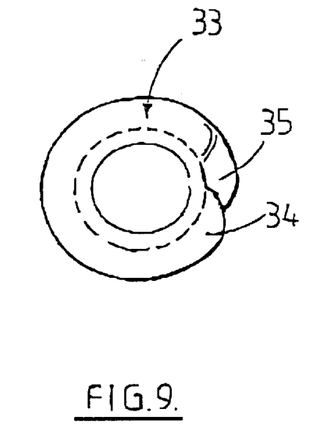
FIG. 9 is an end view of the teat shown in FIG. 8.
Figure 10:
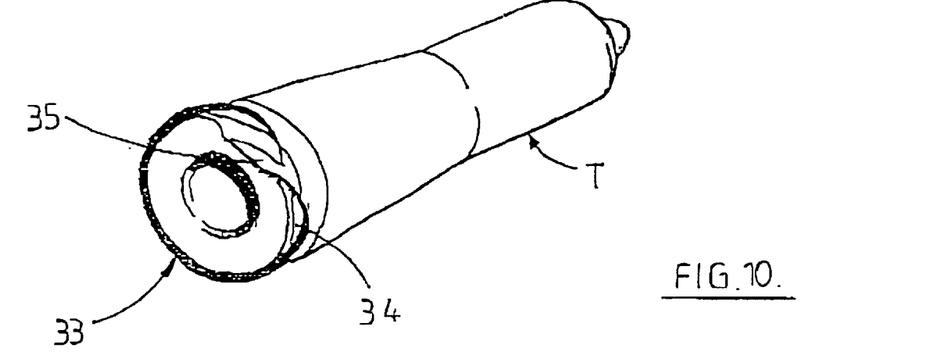
FIG. 10 is a perspective base end view of the teat of FIGS. 8 and 9.

According to the arrangement shown in FIGS. 8 and 9 the base 33 of the teat T has the flange portion 34 formed with an angled slot 35. This angled slot 35 in the flange 34 enables the teat to be installed base end first by simply a twist-on action. This is achieved by the angled slot 35 being of a width commensurate with the thickness of the wall section defining the opening 14. The teat T is simply installed by engaging the lead-in end of the slot 35 with a part of the wall defining the opening 14 and then twisting the teat through approximately 90° (clockwise) substantially about the longitudinal axis of the teat. The teat of this configuration when installed on the container 10 is shown in FIG. 3.

Figure 11:
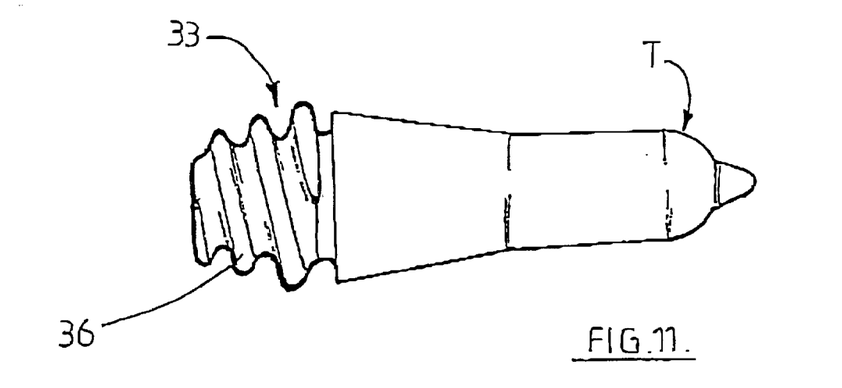
FIG. 11 is an elevation view of yet a further form of teat suitable for use with the container.

In a further form of the teat shown in FIG. 11 the base 33 is longer and has a tapered thread 36. The teat can thus be installed base end first with the opening 14 by simply inserting the narrow or distal end of the base 33 into the unthreaded opening 14 and then applying a screwing action to the teat about its longitudinal axis until the base 33 is fully screwed into the opening 14. The threaded base 33 being elastomeric will seal over the thread.

The teats as shown in FIGS. 8–10 and 11 can be used with other feeding devices and are not intended simply for use with the container of the present invention. The teat according to this configuration is, however, easy to install and remove when compared with conventional arrangements where the feeding end of the teat needs to be pulled through the opening and considerable force applied to force the part of the teat having a greater diameter than that of the opening through the opening so that the opening engages within the grooved base end of the teat. It is therefore believed that this easier installation and removal will result in users more regularly removing a teat for cleaning purposes.

Other means of mounting the teat T can be used. For example the end 13 of the body 11 could have a screw threaded portion adjacent opening 14. The teat T fitting to a threaded ring or cap can then be screwed onto the threaded portion to attach the teat to the container.

A further form of the invention is shown in FIGS. 12–15 in which, for convenience, like parts carry the same reference numerals as those of the previously described embodiment.

According to this form of the invention there is provided a different form of lid and bungy 28 together with a novel means of hinging the lid to the body via the bungy 28. This form of bungy also includes an adjustment means 58 for adjusting the length of the bungy.

The lid 40 has a downwardly depending skirt 41 with a peripheral sealing web 42. The skirt 41 and web 42 are dimensioned to firmly fit within the open mouth 12 of the container as defined by rim 20. Projecting from diametrically opposite sides of the lid 40 is a catch element 43 and a hinge mount 44. The catch 43 has an inwardly projecting ledge 45 which, when the lid is in the closed position, engages in a snap-lock arrangement with a lip 46 located with the rim 20 at a position opposite that of the handle/hook 16 (see FIG. 14).

The hinge mount 44 is formed by an arm 47 which in the preferred form is a continuation of a central rib 48, the latter functioning as strengthening rib for the lid 40 as well as a handle for opening and closing of the lid. As shown, the rib passes through a depression 49 in the top surface of the lid 40 thereby enabling the rib to be gripped either side to function as a handle or gripping portion. At the distal end of arm 47 is a sleeve 50 which incorporates therealong a longitudinal slit 51.

A novel means of hinging the lid 40 to the body 11 is shown in FIGS. 12 and 14 and uses the bungy 28. It will be observed that in this form of the bungy 28 (see FIG. 13) the annular extension 30 is not provided.

One end of the bungy 28 is formed integrally with a curved axle portion 52. This shaft 52 could also, in a less preferred embodiment, be formed as a separate element insert moulded with the bungy 28. As can be seen in FIG. 14, shaft 52 is forced through slit 51 to locate within sleeve 50. In the preferred form a rib 53 extending longitudinally along shaft 52 engages within slot 51 when the shaft is in position in the sleeve 50. To this end, the cross-sectional profile of rib 53 substantially matches the cross-sectional profile of the slot 51 as shown in FIG. 14. Shaft 52 thus does not rotate in sleeve 50.

Shaft 52 projects either side of the extremities of sleeve 50. The surfaces of sleeves 50 which project from the sides of arm 47 form a pair of bearing surfaces which engage in respective shallow curved recesses 54 in opposed top edge surfaces of a pair of spaced apart flanges 55.

Spaced inwardly from shaft 52 and once again in the preferred form constructed integrally with bungy 28 is a pair of opposed studs or spigots 56. These engage respectively in openings 57 formed in the flanges 55 of handle 16. The shaft 52 and studs 56 thus not only function to anchor the bungy 28 to the handle 16 but also provide the hinge pin for hinging the lid 40 to the body 11. This novel hinge arrangement enables the lid 40 to be hingedly mounted in a manner such that the hinge is not prone to breakage over time. Also, the bungy 28 is anchored to the container.

As mentioned previously, the bungy 28 does not include the second annular extension 30. Nevertheless, the length of the bungy is adjustable by an adjuster 58 which is of two-piece construction each piece moulded from a suitable Polymetric material. The adjuster 58 is formed by a base 59 and a top 60, one having studs 61 which can engage in a snap-lock type arrangement in openings 62 in the other. However, in the preferred form base 59 and top 60 are coupled together by a screw S.

Each of the base 59 and top 60 include a pair of side by side openings 63 and a pair of substantially opposed openings 64. The adjuster 58 is located on the bungy so that respective long portions 65 of the bungy extend through a respective opening 64 and 63 with the opening 63 being located closer to the curved end 66 of the bungy. The arrangement is such that the adjuster can be moved away or toward curved end 66 to effectively form a loop at the end 66 and thereby alter the effective length of the bungy 28.

As shown in the dotted detail in FIG. 12, the adjuster 59, 60 (when the bungy 28 is in place to hold the container to a fixture or structure) locates on the front surface of body 11. The end 66 of the bungy 28 is thus held upwardly, as shown, so as to be held away from a feeding animal.

In a preferred form of this embodiment and as shown in FIG. 13 the lid 40 incorporates a vent hole 67. Disposed adjacent this vent hole 67 within the confines of the lid is a pin or projection 68. A dish shaped valve seal 69 of a suitable resilient material has a central opening 70 which can push fit onto stud 68. The dish shape of the seal 69 results in the peripheral edge 71 engaging with the underside surface of the lid 40 so as to close off vent hole 67. However, upon a pressure differential arising due to the pressure within the body 11 (the lid being in the closed position) becoming less than atmospheric pressure the seal is deformed so peripheral edge 71 disengages with the underside surface of the lid so as to open the opening 67 and vent the interior of the body to atmosphere. Once pressure equilibrium is achieved the "memory" of the seal 69 restores the seal to its sealing position.

Other modifications to the invention will be apparent to those skilled in the art and are modifications which, while not disclosed herein, nevertheless fall within the scope of the invention as defined by the following claims.

What is claimed is:

1. A feeding nipple comprising:
a one piece elongate hollow body having a mounting part of elastomeric material and an outlet end, the mounting part incorporating a male thread, wherein in use a feeding teat can be threaded into an opening in a feeding container;
a bore which extends from an inlet opening in the mounting part to the interior of the hollow body; and
a valve located in the bore in the mounting part.

2. The nipple according to claim 1, wherein the male thread is a tapered thread.

3. The nipple according to claim 1, wherein the teat is moulded from the elastomeric material.

4. The nipple according to claim 1, wherein the exterior of the body has an outwardly flaring portion whose greatest cross-sectional dimension is at a shoulder, a lead in end of the male thread being located adjacent the end of the mounting part having said inlet opening, and a distal end of the male thread terminating a distance from said shoulder.

5. The nipple according to claim 4, further comprising a peripheral groove located between said shoulder and said distal end of the male thread.

6. The feeding nipple according to claim 1 in combination with a feeding container, the male thread of the feeding nipple being threaded into a female opening in the feeding container.

7. The combination of claim 6, wherein the feeding container comprises a hollow container with an open top part and a lower end part to which the feeding nipple is threadingly engaged.

8. The combination of claim 7, wherein the open top part of the container is closed by a removable lid.

9. The combination of claim 8, wherein the lid is hingedly coupled to the container.

10. The combination of claim 7, wherein the lid includes a venting valve.

11. The combination of claim 7, wherein the container includes a flexible attachment element and anchor member on the container to co-operate with the attachment element to facilitate mounting of the container to a fixture or structure.

12. The combination of claim 11, wherein the flexible attachment element is an endless length of elastomeric material.

13. The combination of claim 12, wherein the anchor member is a handle spaced from an external surface of the container.

14. The combination of claim 11, wherein the body of the container tapers toward the lower end part.

\* \* \* \* \*